United States Patent
Grossman et al.

[11] Patent Number: 5,805,791
[45] Date of Patent: Sep. 8, 1998

[54] METHOD AND SYSTEM FOR DETECTION OF AND GRACEFUL RECOVERY FROM A PERIPHERAL DEVICE FAULT

[75] Inventors: Leonid Grossman, Cupertino; Sherman Lee, Rancho Palos Verdes; Ramkrishna Vepa, Fremont, all of Calif.

[73] Assignee: Advanced Micro Devices, Inc., Sunnyvale, Calif.

[21] Appl. No.: 635,845

[22] Filed: Apr. 22, 1996

[51] Int. Cl.$^6$ ..................................................... G06F 11/00
[52] U.S. Cl. .................. 395/182.21; 395/185.01
[58] Field of Search ..................... 395/180, 181, 395/182.21, 182.22, 185.01, 185.02, 185.03, 185.04, 651; 370/453, 457

[56] References Cited

U.S. PATENT DOCUMENTS

| | | | |
|---|---|---|---|
| 5,291,494 | 3/1994 | Bruckert et al. | 395/182.22 |
| 5,371,742 | 12/1994 | Brown | 395/181 |
| 5,390,326 | 2/1995 | Shah | 371/62 |
| 5,446,872 | 8/1995 | Ayres et al. | 395/180 |
| 5,564,017 | 10/1996 | Corn et al. | 395/200.01 |
| 5,600,785 | 2/1997 | Potter | 395/182.21 |

*Primary Examiner*—Albert Decady
*Attorney, Agent, or Firm*—Sawyer & Associates

[57] ABSTRACT

A system and method for detecting and gracefully recovering from a peripheral device fault has been disclosed. The method detects whether a peripheral device has suffered from a peripheral device fault. Where the peripheral device fault has occurred, the method determines whether any of a plurality of processes executable by the peripheral device is currently being executed by the peripheral device. The plurality of processes comprises those process which could result in significant loss of data, loss of connection to a network or adversely affect the performance of the peripheral device if the peripheral device is reset during execution of any of the plurality of processes. If none of the plurality of processes is being executed by the peripheral device, the method automatically resets the peripheral device. According to the method and system disclosed, peripheral devices can be made to recover from faults without user intervention, without loss of connection to any networks, and with minimal loss of data. Reliability is improved, thereby increasing overall system performance.

42 Claims, 4 Drawing Sheets

FIG. 4

METHOD AND SYSTEM FOR DETECTION OF AND GRACEFUL RECOVERY FROM A PERIPHERAL DEVICE FAULT

FIELD OF THE INVENTION

The present invention relates to network and peripheral device drivers and more particularly to a method and system for detection of and graceful recovery from a peripheral device fault.

BACKGROUND OF THE INVENTION

In order to run peripheral applications, operating systems must be capable of interfacing with the application. In order to do so, peripheral devices called network controllers are employed. Typically, a network or device driver is used to control and communicate with the network controller or peripheral device.

A network or device driver should be able to address faults associated with the network controller or peripheral device. For example, a typical fault occurring in some network controllers is that the network controllers fail or stop without warning. This is particularly true of PC net controllers. In addition, the fact that a fault has occurred is not detected by typical network or device drivers. Other peripheral devices may also be subject to such faults.

In order to "gracefully recover from a fault, a network controller or peripheral device must recover without user intervention, without significant loss of data, without causing further faults, and, generally, with no loss of connection to a network. When a network controller or peripheral device fails to gracefully recover from a fault, the network or device driver's ability to access and control the network controller or peripheral device is adversely affected. Consequently, a network or device driver should be capable of making a network controller or peripheral device gracefully recover from a fault.

A given network or device driver should also be compatible with a variety of operating systems. Typically, each operating system functions differently. For example, an operating system may be either single threaded or multi-tasking. A network or device driver should be compatible with both types of operating systems. Accordingly, what is needed is a method and system for detecting and gracefully recovering from a fault in a network controller or other peripheral device. The method and system should also be compatible with a variety of operating systems. The present invention addresses such a need.

SUMMARY OF THE INVENTION

The present invention provides a method and system for detecting and recovering from a peripheral device fault. Initially, the method and system detect whether a fault has occurred in a peripheral device. If a fault has occurred, the method and system determine whether any process of a plurality of processes is currently being executed. The plurality of processes comprises those process which could result in significant loss of data, loss of connection to a network or adversely affect the performance of the peripheral device if the peripheral device is reset during execution of any of the plurality of processes. If none of the plurality of processes is being executed by the peripheral device, the method automatically resets the peripheral device.

According to the method and system disclosed herein, the present invention detects and provides graceful recovery from peripheral device faults. Consequently peripheral devices can recover from faults without user intervention, without loss of connection to any networks, and with minimal loss of data. Reliability is improved, thereby increasing overall system performance.

DESCRIPTION OF THE INVENTION

The present invention relates to an improvement in peripheral device drivers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Device drivers are typically used to interface between a host operating system and peripheral devices, such as network controllers. Usually an interface layer exists between the operating system and the peripheral device. The portion of the interface layer dedicated to communication with the peripheral device typically comprises the device driver.

Typically, a device driver is structured in layers. The upper layers of the device driver are generally dedicated to communication with the operating system and network protocols. The lower layers of the device driver are usually dedicated to interfacing with hardware, such as the network controller or other peripheral device.

Because the lower layers of the device driver are implemented prior to a specific operating system being chosen, the lower levels of the device drivers must be compatible with different operating systems. For example, the lower layers of a device driver must be capable of being adapted to both single threaded and multi-tasking operating systems. In other words, any process that the device driver uses to control the network controller or peripheral device must function in various types of operating systems. Consequently, the lower layers of the device driver must be capable of controlling the hardware in a manner compatible with both single threaded and multi-tasking operating systems.

A fault associated with peripheral devices, particularly network controllers, is that they are subject to a variety of failures that occur without warning. Although they are subject to failure, the specifications for these network controllers or peripheral devices indicate that the network controller or peripheral device will not fail without warning. This is particularly true of PC net controllers. Typical network drivers are unable to detect the fact that a fault has occurred or make the peripheral device gracefully recover from such a fault.

For example, when a data packet is to be sent, the network controller may attempt to access a data bus being used. The network controller becomes "starved," resulting in a data underflow condition. The network controller should wait, flag the error, and attempt to access the bus at a later time. Instead, the controller simply stops.

Although there should be bits in the network controller indicating the chip's status, conventional network drivers do not read these bits. Typical network drivers assume that the network controllers do not stop due to underflow conditions because the specifications for network controllers state that the network controller is functional under these conditions. In addition, it may be impossible for the network driver to determine whether the network controller is working.

In direct memory access ("DMA") network controllers, for example, data are copied directly to main memory from the data packet. During this process, the network driver cannot check to ensure that the network controller is still functioning. Similarly, even in programmed input/output ("IO"), the network driver can only check to ensure that the network controller has not stopped during the period that data are not being transferred. Consequently, typical network drivers follow the protocols for the network controller, only checking the status of the data packet which does not reflect the fact that the network controller has stopped. Thus, conventional network drivers neither detect nor allow for graceful recovery from a network controller fault.

A network controller may also stop when, for some reason, the controller misses a data packet it should receive. For example, all the buffers of a network controller may be full when a packet arrives. The network controller will not receive the packet, resulting in a missed packet condition. Consequently, the controller stops even though the specifications for the network controller state that the controller should function under these conditions. As discussed with respect to DMA and programmed 10 protocols discussed above, typical drivers are unable to tell that the controller is not functioning. Consequently, the network controller does not recover from the fault without user intervention and the potential for loss of information.

In order to provide a smooth interface between the operating system and the peripheral device, the device driver must be able to allow the system to gracefully recover from faults. A graceful recovery from a fault is one in which user intervention, such as rebooting the computer, is not required, there is minimal loss of data, no other peripheral device faults are caused, and, in the case of network controllers, connection to the network is generally not broken.

As previously discussed, typical device or network drivers do not ensure that the network controller is functioning partly because the network controller is not supposed to stop without warning. Conventional device or network drivers also do not check to ensure that the network controller is functioning because of the extra time and code required. Thus, these drivers rely on the user to reboot the computer in order to recover from the fault. Such a recovery can result in a loss of a significant amount of data or a lost connection to the network. Thus, a method and system for graceful recovery are desired.

A conventional method for addressing problems due to failures in a peripheral device or network controller is using a "dead man's timer" in the device or network driver. The "dead man's timer" resets the peripheral device or network controller at preset intervals. Consequently, user intervention is not required. However, the "dead man's timer" can adversely affect the performance of the peripheral device or network driver. For example, the timer can reset the controller while the network controller is receiving or transmitting data. This problem is especially noticeable in systems which are multi-tasking or single threaded but simultaneously execute two process by switching between tasks and preset intervals. If the controller is reset while two processes are being executed, the network controller may receive data for a process which the network controller is not prepared to execute, thereby adversely affecting the network controller's performance.

Although typical drivers function when the network controller or peripheral device operates as expected, those with ordinary skill in the art will realize that typical drivers are incapable of functioning when the peripheral device or network controller suffers from erratic faults. Although a "dead man's timer" has been implemented to address erratic stops of the network controller or peripheral device, the "dead man's timer" has problems associated with it. These problems are particularly significant in multi-tasking environments.

The present invention provides for a method and system for detecting peripheral device faults and allow the peripheral device to gracefully recover from faults. The present invention will be described in terms of a network driver. However, one of ordinary skill in the art will readily recognize that this method and system will operate effectively for other types of peripheral devices.

Figure 1:
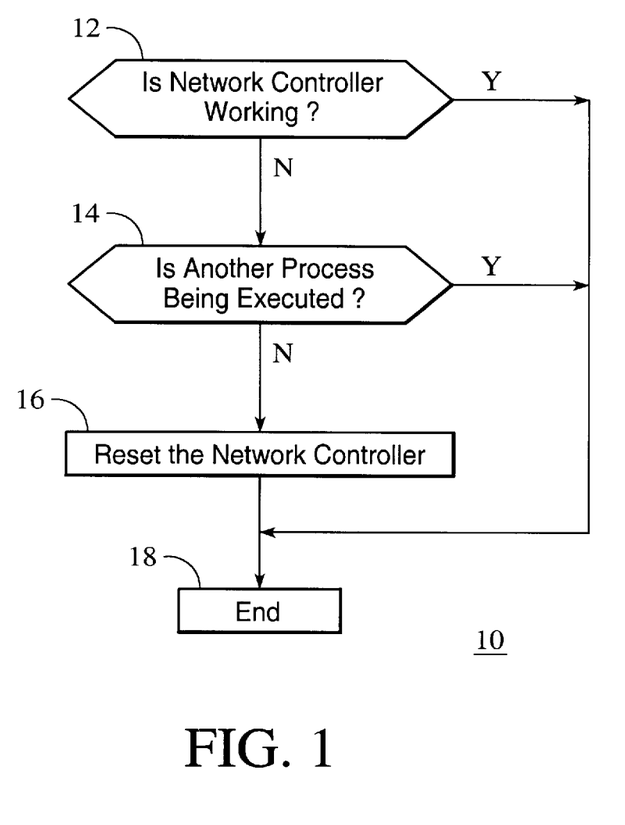
FIG. 1 is a flow chart depicting a simplified embodiment of a method for detection and graceful recovery in accordance with the method and system.

To more particularly illustrate the method and system in accordance with the present invention, refer now to FIG. 1 which displays a simplified flow chart of one embodiment of the method 10. In step 12, the method 10 first determines whether the network controller is working. If the network controller is working, it has not suffered from a fault and does not need to be reset. Consequently, the method 10 skips to step 18 when the network controller is working.

If the network controller is not working, then step 14 determines if another process is being executed. Examples of these processes are a reset of the network controller, reception of data, or a transmission of data. If another process is being executed, the method 10 does not reset the network controller. Consequently, the problems associated with the "dead man's timer," are avoided.

If another process is not being executed, then step 16 resets the network controller. In one embodiment of the method 10, step 16 includes notifying the network driver that the network controller is being reset. Because step 16 is only carried out when another process is not being implemented, the network controller's functions are not adversely affected and there is minimal loss of data. The reset carried out in step 16 also does not result in losing connection to the network. In addition, since step 16 is automatically performed by the method 10, user intervention is unnecessary. Consequently, the method 10 allows for graceful recovery from a network controller fault.

Figure 2:
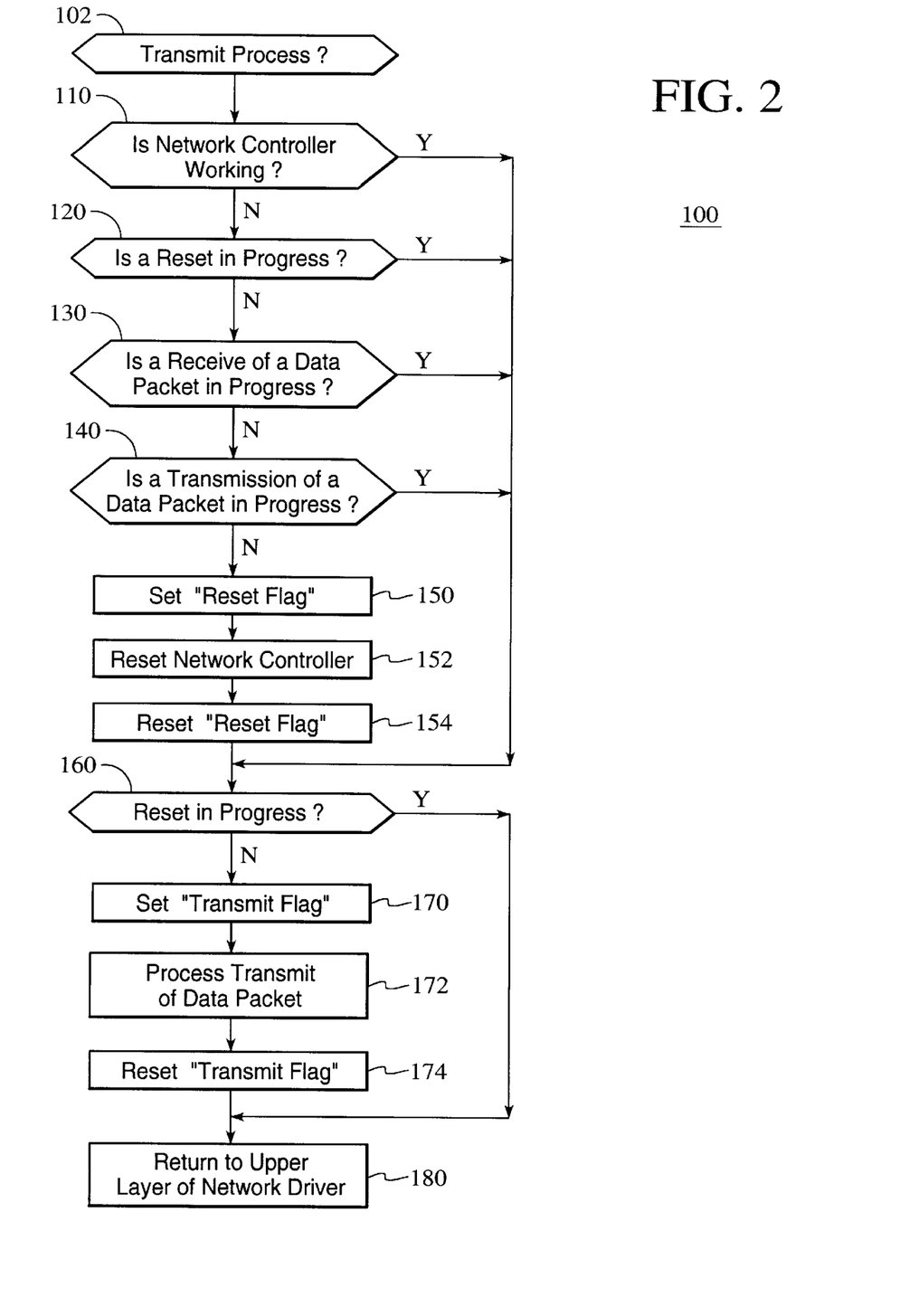
FIG. 2 is a flow chart depicting one embodiment of a procedure for implementation of a transmission of data from a network controller including detection of and graceful recovery from a fault.
Figure 3:
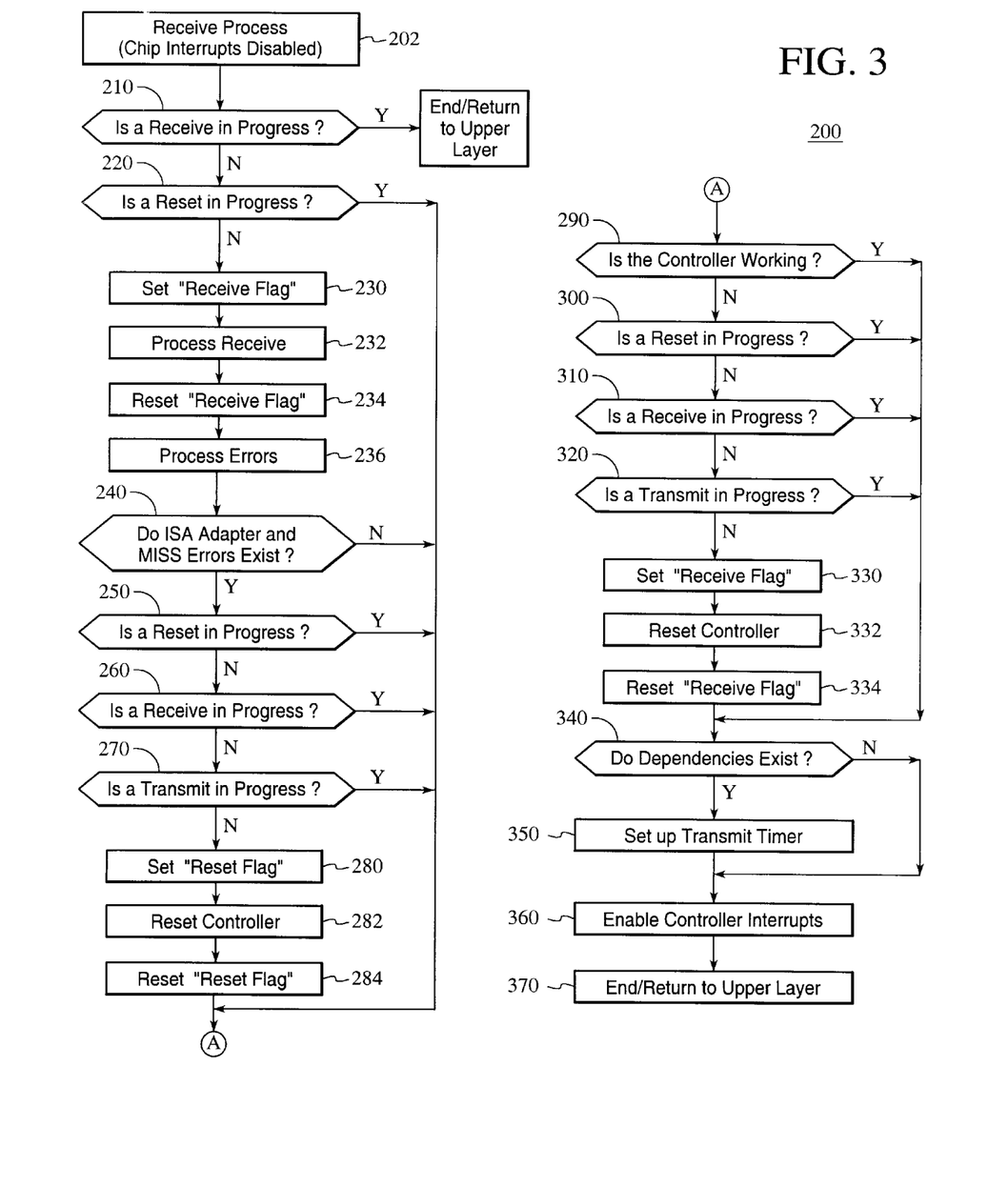
FIG. 3 is a flow chart depicting one embodiment of a procedure for reception of a data packet by a network controller including detection of and graceful recovery from a fault.
Figure 4:
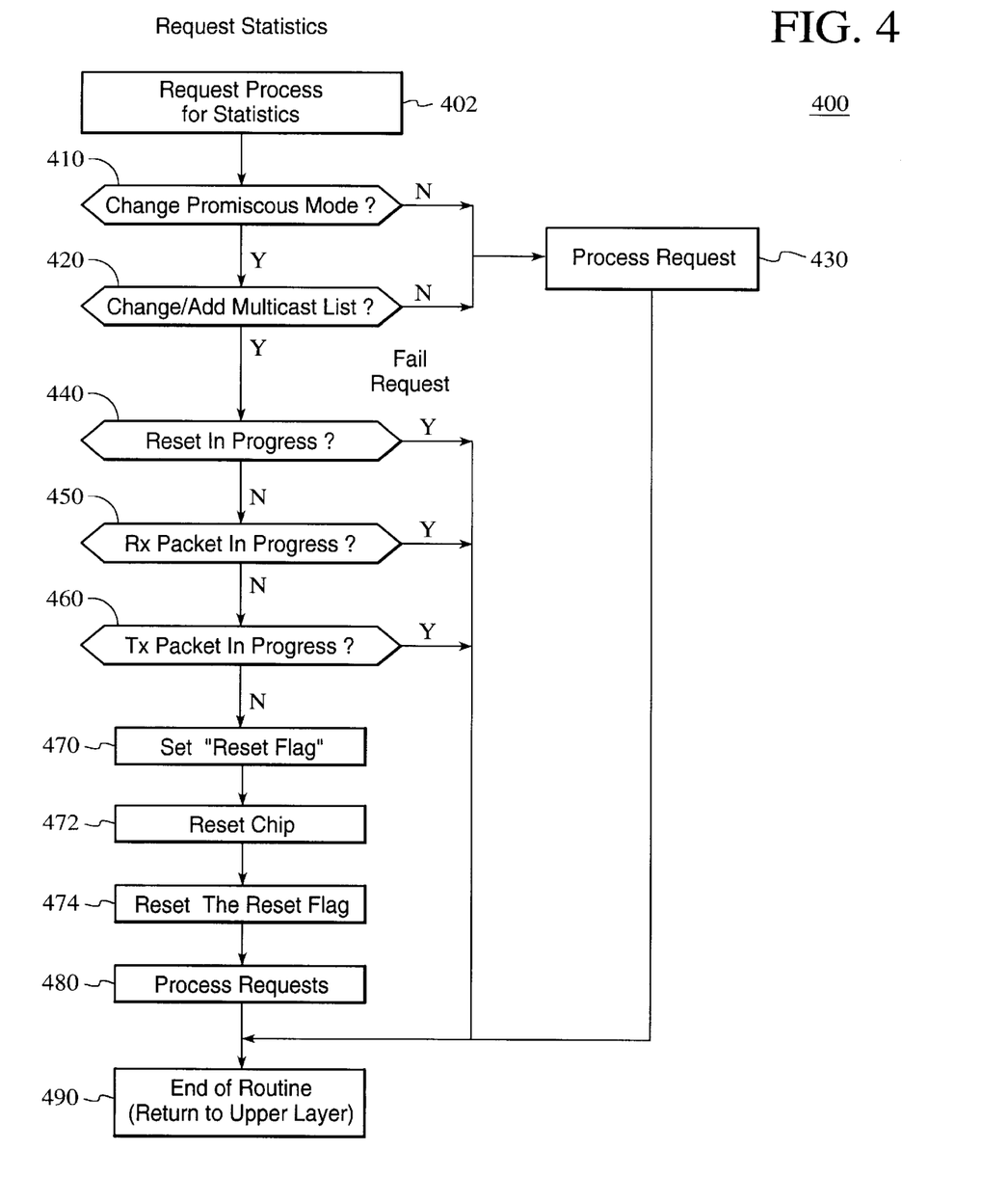
FIG. 4 is a flow chart depicting one embodiment of a procedure for requesting statistics including graceful recovery from a network controller fault.

Under ordinary circumstances, a network driver is accessed to oversee the network controller's performance of specific processes. Consequently, a network driver may execute the method 10 at different times for different processes. For example, in one embodiment of a network driver's procedure for managing a network controller's transmission of data, the network driver executes the method 10 early in the procedure. In contrast, in one embodiment of a network driver's procedure for managing a network controller's reception of data, the network driver need not execute the method 10 until later in the procedure. FIGS. 2–4 display embodiments of procedures a network driver uses to implement a particular process. These procedures include not only executing the desired process but also gracefully recovering from a network controller fault at the appropriate time for the process.

FIG. 2 depicts one embodiment of a procedure 100 used when the network controller is to execute a process for transmitting a data packet. The procedure 100 is carried out every time the network controller is to transmit data. Steps 110–154 of the procedure 100 detect and allow a network controller to gracefully recover from a fault. Consequently, steps 110–154 are embodiments of steps 12–16 in the method 10 of FIG. 1.

Referring now to FIG. 2, the procedure 100 begins by determining that the process to be executed is a transmission of data via step 102. The procedure 100 then detects whether or not a network controller fault has occurred. This is accomplished through step 110, checking if the network controller is working. An embodiment of step 110 comprises checking status registers of the network controller to determine if bits are set. If the bits are set, the network controller is working (no fault detected). If the bits are not set, the network controller is not working (fault detected).

The procedure 100 uses steps 120–140 to determine if another process is in progress. If another process is being executed, the network controller should not be reset. This avoids the problems associated with a "dead man's timer." If any process is being executed, the procedure 100 skips to step 160, discussed below.

Step 120 determines if the network controller is currently being reset. In an embodiment of the procedure 100, a network controller determines if a reset is being executed by checking a "Reset Flag." If the "Reset Flag" is set, the network controller is undergoing a reset. If the "Reset Flag" is in a reset condition, the network controller is not undergoing a reset.

If the network controller is not being reset, step 130 determines whether the network controller is currently receiving data. In an embodiment of the procedure 100, step 130 is executed by querying a "Receive Flag." When the "Receive Flag" is set, the network controller is currently receiving data. If the "Receive Flag" is in the reset condition, the network controller is not currently receiving data.

If the network controller is not receiving data, then step 140 determines whether the network controller is currently transmitting data. In an embodiment, step 140 is executed by checking a "Transmit Flag." If the "Transmit Flag" is set the network controller is currently transmitting data. If the "Transmit Flag" is in the reset condition, the network controller is not currently transmitting data.

If the network controller is also not transmitting data, step 150 sets a "Reset Flag." When set, the reset flag notifies the network driver that a reset is currently being executed. Step 152, resetting the network controller, is then carried out. Once this is accomplished, step 154 resets the "Reset Flag." This indicates to the network driver that the reset process is no longer being executed.

Next, step 160 checks to determine if a reset is in progress. The procedure 100 also skips to step 160 if step 110 ascertained that the network controller was working or steps 120–140 determined that another process was being carried out. When step 120 and step 160 are performed, the procedure 100 checks twice to determine if a reset is in progress. Step 160 is executed because during the time that steps 130–154 were carried out, another reset may have been started due to the network driver's execution of another process. Thus, step 160 ensures that a reset of the network controller is not executed immediately prior to data transmission.

If a reset is not in progress, step 170 sets a "Transmit Flag." When the "Transmit Flag" is set, the driver is notified that data are currently being transmitted by the network controller. Step 172 then transmits the data. When data transmission is complete, step 174 resets the "Transmit Flag," thereby notifying the network driver that data are no longer being transmitted. The procedure 100 then ends via step 180, returning to the upper layers of the driver which interface with the operating system.

If steps 120, 130, or 140 indicate that a process is being executed while the network controller is not working and step 160 determines that a reset is not in progress, steps 170–174 result in the loss of a single transmitted data packet. In this particular embodiment, losing a single data packet is preferable to waiting for the processes in steps 130 or 140 to be completed. This is because the transmission or reception of data may take a significant amount of time. Consequently, an embodiment of the procedure 100 loses a single transmitted data packet rather than slowing run time by pausing until the processes queried in steps 130 and 140 are completed.

FIG. 3 depicts an embodiment of the procedure 200 for use when a DMA network controller has received data. Each time the network controller received data from the network, the procedure 200 is carried out. Note that steps 290–334 in the procedure 200 correspond to the method 10 in FIG. 1. Consequently, the method 10 is executed near the end of the network driver's procedure for processing received data.

The procedure 200 begins after the network controller has generated an interrupt, thereby notifying the network driver that the network controller has transferred data to the network driver memory and that the receive can be processed by the operating system. In step 202, the procedure 200 disables the interrupts for the network controller in order to begin the receive process. Step 210 then checks to see if another data packet is currently being received by the network controller. As in step 130 of FIG. 1, an embodiment of step 210 determines whether the network controller is receiving data by checking the status of the "Receive Flag." If the network controller is receiving data, step 212 returns the system to the upper layers of the network driver.

If the network controller is not receiving data, then step 220 determines if the network controller is currently being reset. As previously discussed, one embodiment determines whether a reset is in progress by checking to see if the "Reset Flag" is set. If the controller is being reset, the procedure 200 skips to step 290, discussed below. If a reset is not in progress, processing of the received data packet can begin.

In order to process the receive, step 230 sets the "Receive Flag," thereby indicating that a receive is in progress. Step 232 then processes the received data. When the data packet has been processed, the "Receive Flag" is reset to indicate that received data is no longer being processed. Any errors are then processed in step 236.

After any errors are processed in step 236, the network driver prepares to access the network controller. Consequently, the next step, step 240, determines whether there are any error conditions that will cause a fault in the network controller. Such errors includes errors in the ISA adapter and MISS errors. If no such error conditions exist, the procedure 200 skips to step 290, discussed below.

If errors that will stop the network controller exist, the procedure 200 must reset the network controller. Consequently, the procedure 200 implements steps 250, 260, and 270 to determine if another process is in progress. Steps 250, 260, and 270 are the same as steps 120, 130, and 140, respectively, in procedure 100. If the network controller is currently being reset, receiving data, or transmitting data the procedure 200 skips to step 290, discussed below. If none of the above processes are in progress, step 280 sets the "Reset Flag" to indicate that a reset is being executed. Step 282 then resets the network controller. After the network controller is reset, step 284 resets the "Reset Flag," thereby indicating to the network driver that the network controller is no longer being reset.

The procedure 200 then implements step 290, to check to determine if the network controller is working. If the network controller is working, the procedure 200 skips to step 340, described below. If the chip is not working, steps 300–334 may be implemented. Steps 300–334 determine if another process is being executed and, if necessary, reset the network controller. If the network controller is being reset, or another process is in progress then steps 300–320 skip to step 340. In an embodiment of the method and system, the procedure 200 determines if another process is being executed by querying the flags for that process.

If the network controller must be reset, then the driver is notified that a reset is occurring. In an embodiment of the method and system the procedure 200 notifies the driver that a reset is being executed using the "Reset Flag." When the "Reset Flag" is set by step 330, the flag indicates that the network controller is being reset. Step 332 then resets the network controller. Step 334 then resets the "Reset Flag," signifying that the reset is completed.

Next, the procedure 200 implements step 340, checking to determine if there are any dependencies. If there are dependencies, the procedure 200 implements step 350, setting the transmit timer. If there are no dependencies, step 350 is omitted.

The procedure 200 finishes the operations required to process a receive of data by enabling the network controller's interrupts in step 360. Finally, step 370 returns to the operating system routine that has called the driver to process the received data.

FIG. 4 depicts the procedure 400 used when the driver processes a request for statistics. The procedure 400 first implements step 402, determining that the process is a request for statistics. Step 410 then determines if one of the statistical processes requested is a change the promiscuous mode or multicast list. In a preferred embodiment, the only statistical processes which require that the network controller be reset are changing the promiscuous mode and multicast list. If the statistical process requested is not changing the promiscuous mode or multicast list, then step 420 is implemented. Step 420 processes the statistical request. The procedure 400 would then skip to step 480, returning to the upper layers of the driver.

If the statistical process requested is changing the promiscuous mode or multicast list, then the network controller must be reset using steps 430–470. Consequently, steps 430–450 determine if a reset or other process is currently being executed. If another process is being carried out, then the procedure 400 skips to step 480. If another process is not being implemented, then the network controller is reset in steps 460–464. During the reset, the driver is notified that a reset is occurring. In the procedure 200, this notification is accomplished through the setting and resetting of the "Reset Flag" in steps 460 and 464, respectively.

After the network controller has been reset, step 470 processes any other statistical requests. Finally, the procedure 400 uses step 480 to return to the upper layers of the driver.

A method and system have been disclosed for providing graceful recovery from a network controller or peripheral device fault. The method and system provide graceful recovery from a fault by detecting the fault and, when necessary, resetting the network controller only when another process is not currently being implemented. In addition, one embodiment of the method and system executes provides these functions in a manner that is unique to each process the network driver implements.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for detecting and enabling a peripheral device to gracefully recover from a peripheral device fault comprising the steps of:

(a) detecting whether the peripheral device has undergone a peripheral device fault;

(b) determining whether any of a plurality of processes is currently being executed if the peripheral device fault has occurred, the plurality of processes further comprising those processes which could result in significant loss of data, loss of connection to a network or adversely affect the performance of the peripheral device if the peripheral device is reset during execution of any of the plurality of processes; and (c) automatically resetting the peripheral device if none of the plurality of processes is currently being executed.

2. The method of claim 1 wherein resetting step (c) further comprises:

(c1) providing notification that the peripheral device is being reset;

(c2) automatically resetting the peripheral device; and (c3) providing notification that the peripheral device is not being reset.

3. The method of claim 1 wherein fault detecting step (a) further comprises the step of:

(a1) checking at least one status register of the peripheral device to determine if at least one bit is set.

4. The method of claim 1 wherein process determining step (b) further comprises the step of:

(b1) ascertaining whether a flag for any of the plurality of processes has been set.

5. A method for detecting and enabling a network controller to gracefully recover from a network controller fault comprising the steps of:

(a) detecting whether the network controller has undergone a fault;

(b) determining whether any of a plurality of processes is currently being executed if the network controller fault has occurred, the plurality of processes further comprising those processes which could result in significant loss of data, loss of connection to a network or adversely affect the performance of the network controller if the network controller is reset during execution of any of the plurality of processes; and (c) automatically resetting the network controller if none of the plurality of processes is currently being executed.

6. The method of claim 5 wherein resetting step (c) further comprises:
   (c1) providing notification that the network controller is being reset;
   (c2) automatically resetting the network controller; and
   (c3) providing notification that the network controller is not being reset.

7. The method of claim 6 wherein fault detecting step (a) further comprises the step of:
   (a1) checking at least one status register of the peripheral device to determine if at least one bit is set.

8. The method of claim 5 wherein process determining step (b) further comprises:
   (b1) ascertaining whether a flag for any of the plurality of processes has been set.

9. The method of claim 5 wherein the plurality of processes further comprise a reset process; a transmit process; and a receive process.

10. The method of claim 8 wherein the plurality of processes further comprise a reset process; a transmit process; and a receive process.

11. A method for processing a transmit of data by a network controller comprising the steps of:
   (a) detecting whether the network controller has undergone a fault;
   (b) determining whether any of a plurality of processes is currently being executed if the fault has occurred, the plurality of processes further comprising those processes which could result in significant loss of data, loss of connection to a network or adversely affect the performance of the network controller if the network controller is reset during execution of any of the plurality of processes;
   (c) automatically resetting the peripheral device if none of the plurality of processes is currently being executed;
   (d) determining whether a network controller is being reset; and
   (e) processing the transmit of data if the network controller is not being reset.

12. The method of claim 11 wherein processing step (e) further comprises the steps of:
   (e1) providing notification that the transmit is in progress;
   (e2) processing the transmit;
   (e3) providing notification that the transmit is no longer in practice.

13. The method of claim 12 wherein process resetting step (c) further comprises the steps of:
   (c1) providing notification that the network controller is being reset;
   (c2) automatically resetting the network controller; and
   (c3) providing notification that the network controller is not being reset.

14. The method of claim 13 wherein the process determining step (b) further comprises
   (b1) ascertaining whether a flag for any of the plurality of processes is set.

15. The method of claim 14 wherein the plurality of processes further comprises a reset, the transmit of data, and a receive of data.

16. A method for processing a receive of data comprising the steps of:
   (a) determining whether any of a first plurality of processes is currently being executed, the first plurality of processes further comprising those processes which could result in significant loss of data, loss of connection to a network or adversely affect the performance of the network controller if the network controller is reset during execution of any of the plurality of processes;
   (b) processing the receive of data if none of the plurality of processes is currently being executed;
   (c) processing any errors;
   (d) determining whether any errors that will cause a network controller fault exist;
   (e) determining whether any of a second plurality of processes is currently being executed if any errors that will cause the network controller fault exist, the second plurality of processes further comprising those processes which could result in significant loss of data, loss of connection to a network or adversely affect the performance of the network controller if the network controller is reset during execution of any of the second plurality of processes;
   (f) automatically resetting the network controller if none of the second plurality of processes is currently being executed;
   (g) determining whether the network controller has undergone a fault;
   (h) determining whether any of a third plurality of processes is in progress if the network controller has undergone a fault, the third plurality of processes further comprising those processes which could result in significant loss of data, loss of connection to a network or adversely affect the performance of the network controller if the network controller is reset during execution of any of the third plurality of processes;
   (i) automatically resetting the network controller if none of the third plurality of processes is in progress;
   (j) checking dependencies; and
   (k) if dependencies exist, setting a transmission timer.

17. The method of claim 16 further comprising the steps of:
   (l) enabling the network controller's interrupts.

18. The method of claim 17 wherein the first plurality of processes further comprise the reset process and the receive process.

19. The method claim 18 wherein the processing the receive step (b) further comprises the steps of
   (b1) setting a receive flag;
   (b2) processing the receive of data; and
   (b3) resetting the receive flag.

20. The method of claim 19 wherein the errors that will cause the network controller fault exist further comprise ISA errors and MISS errors.

21. The method of claim 20 wherein the second plurality of processes further comprise the reset and the receive of data.

22. The method of claim 21 wherein step (e), determining any of a second plurality of processes is in progress, further comprises the step of
   (e1) ascertaining whether a flag for any of the second plurality of processes has been set.

23. The method of claim 22 wherein step (f), resetting the network controller if none of the second plurality of processes is in progress, further comprises the steps of:
   (f1) providing notification that a reset is in progress;
   (f2) automatically resetting the network controller; and
   (f3) providing notification that a reset is not in progress.

24. The method of claim 23 wherein step (f1) further comprises the step of setting a reset flag; and step (f2) further comprises the step of resetting the reset flag.

25. The method of claim 23 wherein fault determining step (g) further comprises the step of
(g1) checking status registers of the network controller to determine if the bits are set.

26. The method of claim 23 wherein determining whether any of a third plurality of processes is being executed step (h) further comprises the step of
(h1) ascertaining whether a flag for any of the third plurality of processes has been set.

27. The method of claim 23 wherein step (i), resetting the network controller if none of a third plurality of processes is currently being executed further comprises the steps of:
(i1) providing notification that a reset is in progress;
(i2) automatically resetting the network controller; and
(i3) providing notification that a reset is not in progress.

28. The method of claim 27 wherein step (i1) further comprises the step of setting a reset flag; and step (i2) further comprises the step of resetting the reset flag.

29. A method for processing a statistics process comprising the steps of:
(a) determining if the statistics process includes a change in a promiscuous mode;
(b) if the statistics process includes a change in the promiscuous mode, determining if the statistics process includes a change in a multicast list;
(c) if the statistics process includes neither a change in the promiscuous mode nor a change in the multicast list, executing the statistics process;
(d) determining whether any of a plurality of processes is currently being executed if the statistics process includes a change in the promiscuous mode and a change in the multicast list, the plurality of processes further comprising those processes which could result in significant loss of data, loss of connection to a network or adversely affect the performance of the network controller if a network controller is reset during execution of any of the plurality of processes;
(e) automatically resetting the network controller if none of the plurality of processes is currently being executed; and
(f) executing the statistics process.

30. The method of claim 29 wherein the plurality of processes further comprises a reset; a transmit of data; and a receive of data.

31. The method of claim 30 wherein resetting step (e) further comprises the steps of:
(e1) providing notification that a reset is in progress;
(e2) automatically resetting the network controller; and
(e3) providing notification that a reset is not in progress.

32. The method of claim 31 wherein determining if at any of the plurality of processes is currently being executed step (d) further comprises the step of
(d1) ascertaining whether a flag for any of the plurality of processes has been set.

33. A peripheral device driver comprising:
means for detecting a fault in a peripheral device;
means responsive to the means for detecting, for determining whether any of a plurality of processes is currently being executed, the plurality of processes further comprising those processes which could result in significant loss of data, loss of connection to a network or adversely affect the performance of the peripheral device if the peripheral device is reset during execution of any of the plurality of processes; and
means, responsive to the means for determining whether any of the plurality of processes is currently being executed, for automatically resetting the peripheral device if none of the plurality of processes is currently being executed.

34. The peripheral device driver of claim 33 wherein the means for automatically resetting further comprise means for providing notification of whether the peripheral device is being reset.

35. The peripheral device driver of claim 34 wherein the means for providing notification further comprise means for ascertaining whether a flag corresponding to any of the plurality of processes is set.

36. The peripheral device driver of claim 34 wherein the means for detecting the fault further comprise means for ascertaining whether bits in a status register of the peripheral device are set.

37. A network controller driver comprising:
means for detecting a fault in a network controller;
means responsive to the means for detecting, for determining whether any of a plurality of processes is currently being executed, the plurality of processes further comprising those processes which could result in significant loss of data, loss of connection to a network or adversely affect the performance of the peripheral device if the peripheral device is reset during execution of any of the plurality of processes; and
means responsive to the means for determining whether any of the plurality of processes is currently being executed, for automatically resetting the peripheral device if none of the plurality of processes is currently being executed.

38. The network controller driver of claim 37 wherein the means for determining whether any of the plurality of processes is currently being executed further comprise:
means for determining if a reset is currently being executed;
means for determining if a receive of data is currently being executed; and
means for determining if a transmit of data is currently being executed.

39. The network controller driver of claim 38 wherein the means for automatically resetting further comprise means for providing notification of whether the network controller is being reset.

40. The network controller driver of claim 39 wherein the means for notification further comprise means for ascertaining whether a flag corresponding to any of the plurality of processes is set.

41. The network controller driver of claim 40 wherein the means for determining whether any of the plurality of processes is currently being executed further comprise:
means for ascertaining whether a reset flag is set;
means for ascertaining whether a receive of data flag is set; and
means for ascertaining whether a transmit of data flag is set.

42. The network controller driver of claim 41 wherein the means for detecting the fault further comprise means for ascertaining whether bits in a status register of the network controller are set.

* * * * *